May 8, 1951      H. WILLS      2,551,990
STORAGE BATTERY HOLD-DOWN AND TERMINAL CONTACT DEVICE
Filed Feb. 28, 1950
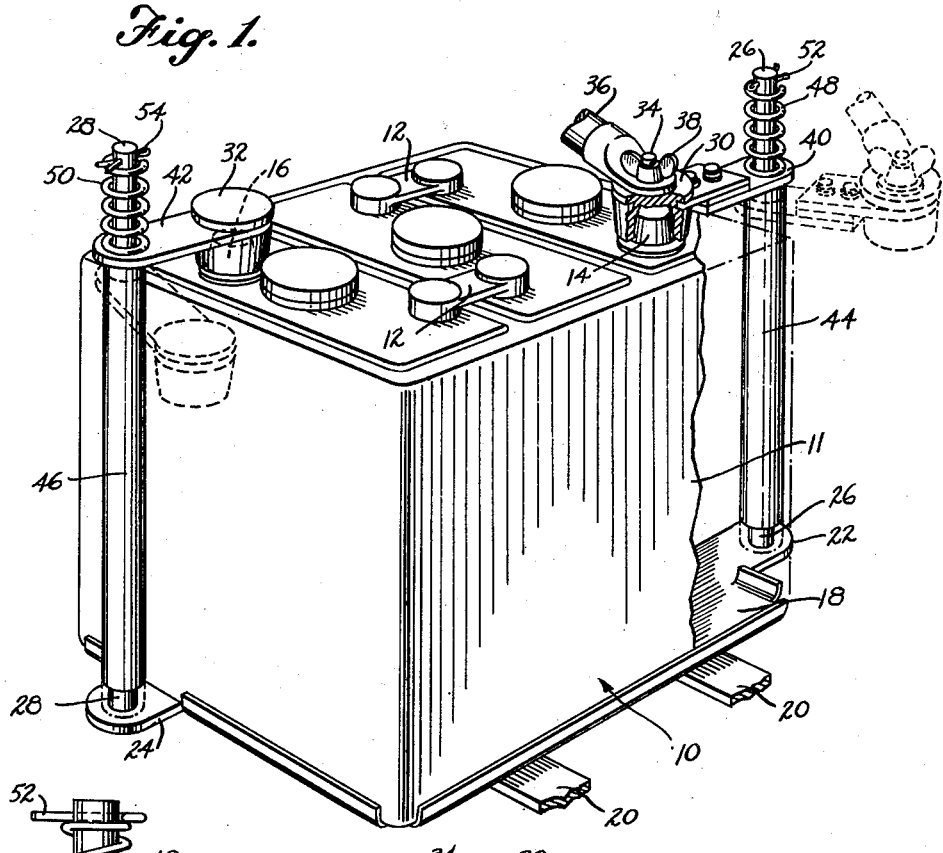
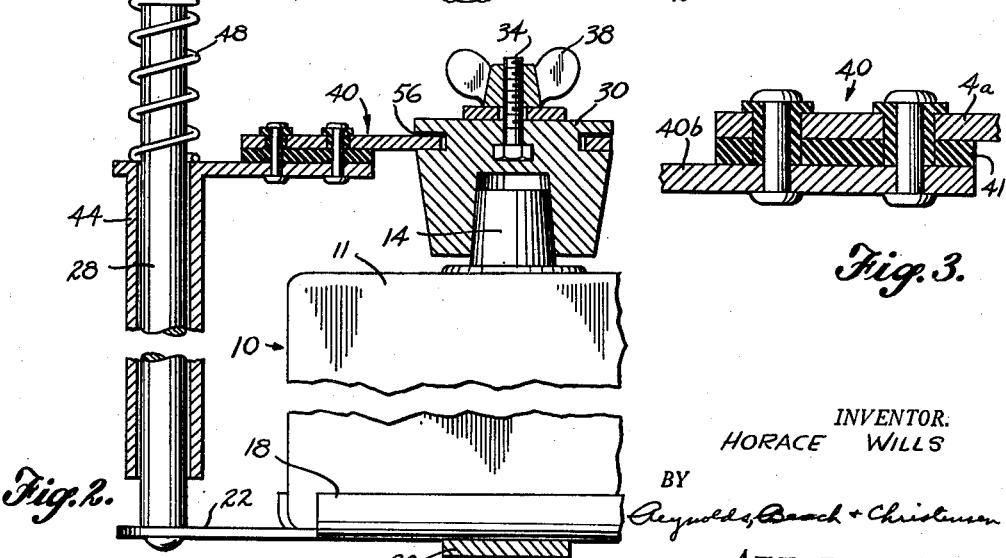
INVENTOR.
HORACE WILLS
BY
Reynolds, Beach & Christensen
ATTORNEYS Patented May 8, 1951

2,551,990

UNITED STATES PATENT OFFICE 2,551,990

STORAGE BATTERY HOLD-DOWN AND TERMINAL CONTACT DEVICE

Horace Wills, Seattle, Wash.

Application February 28, 1950, Serial No. 146,852

1 Claim. (Cl. 136—171)

This invention relates to a combined hold-down and terminal contact device for storage batteries employed in automobiles and similar installations. The principal object is to provide an inexpensive and sturdy device performing both of these functions while being adapted for quick engagement and correspondingly quick disengagement of the battery connections to enable its installation and removal quickly and conveniently.

A further and more specific object of the invention is to avoid the various difficulties with prior types of battery mounts incorporating screw-retained battery hold-down devices and separately operated screw-tightened clamps for connecting the battery's circuit leads to its terminal posts. Frequently corrosion of the parts, together with inaccessibility to a wrench or other tool, have made removal and installation of batteries in such earlier mounts a laborious and time-consuming operation. In some previous cases the battery was boxed in so completely by retaining structure as to make it difficult for a person to secure a hold upon the heavy battery for lifting it from its box.

In providing a simplified and more convenient battery hold-down, the present invention insures that the battery will be held firmly against the displacing tendencies of road shocks and jarring of an automobile, for example, while at the same time enabling use of a simple battery support from which the battery may be lifted and replaced with comparative ease and convenience.

A further and important object is to enable combining into a single and easily executed operation, the operative positioning of a battery hold-down element and of a terminal contact element, and similarly the removal of such elements from the battery in a simple reverse operation. Furthermore the invention is aimed at eliminating the need for tools in accomplishing the installation and removal of storage batteries and their connections, while effecting satisfactory electrical connections to the battery posts which will have minimum tendency to corrode.

In achieving these ends, the invention briefly comprises slip-on battery post contact caps which fit snugly on a battery terminal post both for establishing electric contact and for transmitting hold-down pressure to the battery. Each such cap is carried by a hold-down arm guided for vertical movement on an upright support stationed by the side of the battery. Normally such arm is spring-urged downwardly to exert a retaining force on the battery through its terminal post. Such arm is also pivoted on its support, so that, by raising the cap from the battery post against the spring tension, it can be swung aside and thereby afford ample clearance to enable lifting the battery directly from its support without interference from the contact cap or hold-down arm. One of the arms effects a ground circuit from its support direct to its cap, while a wire may be connected directly to the other cap. Replacement and removal of the battery is thereby greatly simplified and facilitated because of the relative ease with which the combined hold-down and terminal contact device may be operatively positioned and removed without other disconnection and reconnection of electric circuit wires.

These and other features, objects and advantages of the invention including certain details of its preferred form will become more fully evident from the following detailed description based upon the accompanying drawings.

Figure 1 is an isometric view of the preferred form of the combined hold-down and terminal contact device as applied to a storage battery installation of a type suitable for automobiles, for example.

Figure 2 is a vertical sectional view showing details of one of the hold-down elements and associated structure in operative position, parts thereof being broken away for convenience in illustration.

Figure 3 is a longitudinal sectional view of the intermediate portion of one of the arms, showing certain installation details.

The relative proportions and general details of the illustrated battery 10 shown in Figure 1 suggests it to be of the lead storage cell type, such as those used in most, if not all, American made automobiles. However, it will be evident that the invention may be used with other types of storage batteries. Also the battery may be of the type having the cells in parallel arrangement, as shown, or of the long type having the cells aligned. The battery shown comprises a case 11 containing three cell units, the intermediate of which is electrically connected to the two outermost units by bridging conductors 12. One of the latter two units has an upright terminal post 14, and the other a similar terminal post 16, one the negative and the other the positive battery terminal. These terminal posts are generally formed as the frustum of a right circular cone having a slight upward taper as shown.

The preferred and illustrated form of battery support, although by no means the only form with which the invention may be used, comprises a flat rectangular plate 18, the four edges of which are flanged upward to form retaining sides for the bottom of the battery. The spacings between parallel opposite flanges are such that a standard storage battery is closely embraced therebetween and held against any appreciable sidewise movement on the plate 18. The tray-like plate support in turn is mounted in horizontal position by bracket strips 20, or other suitable means, the nature of which is unimportant as far as this invention is concerned.

Two terminal post contact caps 30 and 32 are provided which have inwardly tapered sockets to fit snugly on the respective terminal posts 14 and 16 and form good electrical contact therewith. Such contact is improved by making the caps of lead as are the battery posts. The caps are installed on the posts simply by slipping them down over such posts and are removed by lifting them directly upward therefrom, as will be evident from Figure 2, and are held resiliently in firm engagement with the posts. The cap 30 has a binding post in the form of an upright screw 34, the head of which is embedded in the cap, for connection to a lug carried by the end of the battery cable conductor 36 and clamped against the top face of the cap 30 by wing nut 38. This connection can be left undisturbed during removal and installation of batteries on the support 18 as will later appear. The other cap 32 requires no such binding post screw, since it will usually be grounded, directly through its support.

Both caps 30 and 32 function as hold-down elements acting downwardly on the terminal posts, as well as electric contact elements engaging such posts, the cap 30 being carried by a hold-down arm 40 and the cap 32 by a hold-down arm 42. These arms in turn project horizontally from similar arm-supporting sleeves 44 and 46 which are slidable vertically on upright rods 26 and 28, respectively, and are also free to turn about such rods. The vertical and lateral swinging of the arms thus afforded enables the respective contact caps which they carry to be lifted from their seats on the terminal posts and swung aside, as shown by dotted lines in Figure 1, freeing the battery to be lifted directly from its support 18.

The arms 40 and 42 are secured to their respective caps 30 and 32 in the casting of the latter, or the upper edges of the caps may later be flanged over the arms. By either procedure angular grooves 56 will be formed in the caps in which fit loosely the apertured ends of the arms. The slight clearance thus afforded between the cap grooves and the aperture edges of the arms enables the caps to tilt and shift slightly relative to the arms, insuring snug fitting of the caps on the respective battery posts despite slight variations in battery sizes and inaccuracies in the mounting of the arms. The arm 40 as shown in Figures 2 and 3 is of articulated construction, the two parts 4a and 40b being riveted together in overlapping relationship with an insulating strip 41 received between them and with insulating collars encircling the rivets. Grounding of conductor 36 through the arm and battery support is thus avoided. The arm 42, however, is of unitary construction for direct grounding of cap 32 to the vehicle frame through arm 42 and the battery support.

Near each of two diagonally opposite corners the battery supporting plate 18 has short ears 22 and 24 projecting horizontally from opposite ends of the plate, at locations corresponding to the positions of the respective posts 14 and 16 of the battery. These ears form rigid supports for the upright rods 26 and 28, respectively, the upper ends of which project a short distance above the top of the battery posts. Such rods are conveniently riveted or welded to the ears 22 and 24, but may be otherwise mounted on the battery support or box if desired.

Normally the hold-down arms 40 and 42, hence the contact caps 30 and 32, are urged downwardly along rods 26 and 28 by hold-down springs 48 and 50 encircling the upper end portions of the respective rods and acting downward on the outer ends of such arms. The upper ends of these springs bear upwardly against respective cotter pins 52 and 54 passing through transverse apertures in the rod upper ends. The pressure exerted downwardly against the hold-down arms is made sufficient, by proper selection of these springs, to hold the battery down on its support against the most violent disturbing tendencies expected in the operation of the vehicle.

Moreover, there is a substantial tendency for the sleeves 44 and 46 to bind on the rods 26 and 28 when upward force is exerted on the contact caps by the battery terminal posts, when the vehicle is jolted, for instance. The hold-down arms then act as levers applying moments to the sleeves causing them to cramp on the rods which they surround. This action aids the springs in holding the battery securely down against its support 18, yet the arms may be raised readily at will against the force of the springs for swinging them aside into the dotted line positions without incurring this binding effect simply by lifting the sleeves 44 and 46 directly along with such arms to avoid any cramping tendency. Preferably the sleeves are sufficiently long that their lower ends can drop only a short distance before contacting the ears 22 and 24 when the arms are swung aside and released preliminary to removal of the battery from its support. The arms are thereby maintained in elevated positions where they will be readily accessible later for raising and swinging again into terminal post contacting position.

I claim as my invention:

A combined hold-down and terminal contact device for a storage battery, comprising two upright rods disposed to receive a storage battery therebetween and having lower ends supported fixedly and upper ends projecting upward to a height somewhat above the locations for the tops of the respective battery terminal posts, two quick-engageable terminal contact elements adapted to fit snugly on the respective battery terminal posts and to transmit downward pressure thereon, a hold-down arm carrying each of said elements, a sliding sleeve encircling each of said upright guide rods, secured to its hold-down arm and guiding the same for raising movement to lift its contact element from a battery post, and said sliding sleeves rotatively engaging said rods and guided thereby for swinging about upright axes for movement of said terminal contact elements from registry with the respective battery posts to positions alongside the storage battery to afford clearance for lifting such battery, each such sleeve extending sufficiently along its rod to derive support therefrom for maintaining its arm generally horizontal, and helical springs encircling the upper end portions of said respective rods above said hold-down arms, interengaged between said rods and said arms and reacting downwardly agaist said arms to exert hold-down force thereon, for transmission by the arms and contact elements to the battery posts, thereby to hold the storage battery down while maintaining electrical contact between said contact elements and such battery posts.

HORACE WILLS.

REFERENCES CITED

The following references are of record in the file of this patent:

UNITED STATES PATENTS

| Number | Name | Date |
|---|---|---|
| 1,459,973 | Colgan | June 26, 1923 |
| 1,499,279 | Wootton | June 24, 1924 |
| 1,636,562 | Hick | July 19, 1927 |
| 1,993,893 | Page, Jr. | Mar. 12, 1935 |

FOREIGN PATENTS

| Number | Country | Date |
|---|---|---|
| 198,020 | Germany | May 31, 1907 |